United States Patent
Kohri et al.

(10) Patent No.: US 10,544,293 B2
(45) Date of Patent: Jan. 28, 2020

(54) FLAME RETARDANT RESIN COMPOSITION AND CABLE USING THE SAME

(71) Applicant: FUJIKURA LTD., Tokyo (JP)

(72) Inventors: Haruka Kohri, Chiba (JP); Masayuki Iwata, Chiba (JP); Tomohisa Watanabe, Chiba (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/963,290

(22) Filed: Apr. 26, 2018

(65) Prior Publication Data

US 2018/0244903 A1 Aug. 30, 2018

Related U.S. Application Data

(63) Continuation of application No. 15/038,753, filed as application No. PCT/JP2014/081971 on Dec. 3, 2014, now Pat. No. 9,982,119.

(30) Foreign Application Priority Data

Dec. 4, 2013 (JP) ................. 2013-251231

(51) Int. Cl.

| | |
|---|---|
| C08L 23/06 | (2006.01) |
| C08L 83/04 | (2006.01) |
| H01B 7/295 | (2006.01) |
| H01B 3/44 | (2006.01) |
| H01B 3/46 | (2006.01) |
| C08L 23/02 | (2006.01) |
| C08K 5/098 | (2006.01) |
| C08L 23/08 | (2006.01) |
| C08L 23/12 | (2006.01) |
| C09K 21/02 | (2006.01) |
| G02B 6/44 | (2006.01) |
| H01B 7/02 | (2006.01) |
| H01B 13/14 | (2006.01) |

(52) U.S. Cl.
CPC .............. *C08L 23/06* (2013.01); *C08K 5/098* (2013.01); *C08L 23/02* (2013.01); *C08L 23/0853* (2013.01); *C08L 23/0869* (2013.01); *C08L 23/12* (2013.01); *C08L 83/04* (2013.01); *C09K 21/02* (2013.01); *G02B 6/4436* (2013.01); *H01B 3/441* (2013.01); *H01B 3/447* (2013.01); *H01B 3/448* (2013.01); *H01B 3/46* (2013.01); *H01B 7/0275* (2013.01); *H01B 7/295* (2013.01); *H01B 13/14* (2013.01); *C08L 2201/02* (2013.01)

(58) Field of Classification Search
CPC ...... C08L 23/06; C08L 23/12; C08L 23/0853; C08L 23/0869; C08L 23/02; C08L 2201/02; G02B 6/4436; H01B 3/447; H01B 3/441; H01B 3/46; H01B 3/448; H01B 13/14; H01B 7/0275; H01B 7/295; C09K 21/02

See application file for complete search history.

(56) References Cited

U.S. PATENT DOCUMENTS

| | | | |
|---|---|---|---|
| 4,273,691 | A | 6/1981 | MacLaury et al. |
| 8,331,747 | B1 | 12/2012 | Holcombe et al. |
| 2004/0213527 | A1 | 10/2004 | Martinsson |

FOREIGN PATENT DOCUMENTS

| | | |
|---|---|---|
| EP | 0 802 235 A1 | 10/1997 |
| EP | 0 869 992 B1 | 3/2000 |
| EP | 1 655 741 A1 | 5/2006 |
| EP | 2 677 552 A1 | 12/2013 |
| EP | 2 772 516 A1 | 9/2014 |
| EP | 2805994 A1 | 11/2014 |
| JP | 3-231947 A | 10/1991 |
| JP | 7-296649 A | 11/1995 |
| JP | 10-7913 A | 1/1998 |
| JP | 2001-152035 A | 6/2001 |
| JP | 2001-348466 A | 12/2001 |
| JP | 2013-108053 A | 6/2013 |
| JP | 2013-133411 A | 7/2013 |
| KR | 10-2012-0114726 A | 10/2012 |
| TW | 419500 B | 1/2001 |
| TW | 201244136 A1 | 11/2012 |
| WO | 2005/013291 A1 | 2/2005 |
| WO | 2013/108919 A | 12/2015 |

OTHER PUBLICATIONS

Communication dated Apr. 29, 2016, from the Intellectual Property Office of Taiwan in counterpart application No. 103142189.
Communication dated Jun. 12, 2017 issued by the European Patent Office in counterpart European Application n No. 14867282.7.
Communication dated Sep. 6, 2016, from the Japanese Office Action in counterpart application No. 2015-551539.
Database WPI Week 201408, Thomson Scientific, London, GB, AN 2012-N74991, XP002770634 (3 pages total).
International Search Report for PCT/JP2014/081971 dated Mar. 3, 2015.
Taiwanese Office Action for TW 103142189 dated Jan. 25, 2016.
Camino et al., "Polydimethyisiloxane thermal degradation Part 1. Kinetic aspects," Polymer, vol. 42 2001, p. 2395-2402.
Beyler et al., "SFPE Handbook of Fire Protection Engineerings," Third Edition, 2002, p. 1-110-1-131.
Wilkie et al., "Fire Retardancyof Polymeric Materials" Second Edition, 2010, p. 2395-2402.
Shin Etsu, "Silicones for Resin Modification," 2011, p. 1-12.

*Primary Examiner* — Robert S Jones
(74) *Attorney, Agent, or Firm* — Sughrue Mion, PLLC

(57) ABSTRACT

In a flame retardant resin composition containing a polyolefin resin, a silicone-based compound blended at a ratio of 1.5 parts by mass or more and 20 parts by mass or less relative to 100 parts by mass of the polyolefin resin, a fatty acid containing compound blended at a ratio of 5 parts by mass or more and 20 parts by mass or less relative to 100 parts by mass of the polyolefin resin, and an inorganic flame retardant blended at a ratio of 5 parts by mass or more and 40 parts by mass or less relative to 100 parts by mass of the polyolefin resin, the decomposition onset temperature of the inorganic flame retardant is lower than the decomposition onset temperature of the silicone-based compound.

13 Claims, 4 Drawing Sheets

FLAME RETARDANT RESIN COMPOSITION AND CABLE USING THE SAME

CROSS REFERENCE TO RELATED APPLICATIONS

This application is a Continuation of U.S. application Ser. No. 15,038,753, filed May 24, 2016, which is a National Stage of International Application No. PCT/JP2014/081971 filed Dec. 3, 2014, claiming priority based on Japanese Patent Application No. 2013-251231 filed Dec. 4, 2013, the contents of all of which are incorporated herein by reference in their entirety.

TECHNICAL FIELD

The present invention relates to a flame retardant resin composition and a cable using the composition.

BACKGROUND ART

As a flame retardant resin composition, there is known a composition formed by adding metal hydroxide as a flame retardant to a polyolefin resin, and also adding a silicone-based compound such as silicone oil, or magnesium stearate as a flame retardant aid, for example (see Patent Document 1 described below).

CITATION LIST

Patent Document

Patent Document 1: JPH10-7913 A

SUMMARY OF THE INVENTION

Problem to be Solved by the Invention

However, there is a case in which flame retardancy is not obtained at sufficient level with the composition described in Patent Document 1. Here, when the addition amount of the flame retardant is increased, flame retardancy can be improved. However, in this case, the mechanical property of the composition is deteriorated.

Therefore, there has been a demand for a flame retardant resin composition that can secure excellent flame retardancy while securing an excellent mechanical property.

The invention was achieved under such circumstances, and it is an object of the invention to provide a flame retardant resin composition which can secure excellent flame retardancy while securing an excellent mechanical property, and a cable using this resin composition.

Means for Solving Problem

In order to solve the problems described above, the present inventors studied the magnitude relationship between the decomposition onset temperature of metal hydroxide as a flame retardant and the decomposition onset temperature of a silicone-based compound. As a result, the inventors found that when a silicone-based compound, a fatty acid containing compound such as magnesium stearate, and an inorganic flame retardant such as metal hydroxide or the like are respectively blended at a predetermined ratio relative to 100 parts by mass of a polyolefin resin, the problems can be solved by adjusting the decomposition onset temperature of an inorganic flame retardant to be lower than the decomposition onset temperature of a silicone-based compound, and thus the inventors completed the invention.

Namely, the invention relates to a flame retardant resin composition containing a polyolefin resin, a silicone-based compound blended at a ratio of 1.5 parts by mass or more and 20 parts by mass or less relative to 100 parts by mass of the polyolefin resin, a fatty acid containing compound blended at a ratio of 5 parts by mass or more and 20 parts by mass or less relative to 100 parts by mass of the polyolefin resin, and an inorganic flame retardant blended at a ratio of 5 parts by mass or more and 40 parts by mass or less relative to 100 parts by mass of the polyolefin resin, in which the decomposition onset temperature of the inorganic flame retardant is lower than the decomposition onset temperature of the silicone-based compound.

According to the flame retardant resin composition of the invention, excellent flame retardancy can be secured with an excellent mechanical property secured.

Meanwhile, the present inventors assume that the reason why more excellent flame retardancy can be obtained with the flame retardant resin composition of the invention is as follows.

That is, as the decomposition onset temperature of an inorganic flame retardant is lower than the decomposition onset temperature of a silicone-based compound, at the time of combustion, the inorganic flame retardant is decomposed by heat before the silicone-based compound is decomposed by heat. The decomposition of the inorganic flame retardant at this time is considered to be an endothermic reaction. Accordingly, the temperature increase of a polyolefin resin is sufficiently suppressed and it becomes possible to inhibit continuous combustion. Furthermore, once a silicone-based compound is decomposed by heat, a barrier layer of a silicone-based compound is formed on a surface of the polyolefin resin. The present inventors assume that a flame retardant effect is enhanced based on such reasons.

In the above flame retardant resin composition, the inorganic flame retardant is preferably aluminum hydroxide.

In this case, more excellent flame retardancy can be obtained compared to a case in which the inorganic flame retardant is an inorganic flame retardant other than aluminum hydroxide.

Furthermore, in the flame retardant resin composition, the inorganic flame retardant is preferably blended at a ratio of 10 parts by mass or more and 25 parts by mass or less relative to 100 parts by mass of the polyolefin resin.

In this case, the flame retardancy of the flame retardant resin composition can be more improved compared to a case in which the blending amount of the inorganic flame retardant is not within the aforementioned range.

In the above flame retardant resin composition, the fatty acid containing compound is preferably magnesium stearate or calcium stearate.

In this case, more excellent flame retardancy can be obtained compared to a case in which the fatty acid containing compound is not any one of magnesium stearate and calcium stearate.

The flame retardant resin composition may be composed of the polyolefin resin, the silicone-based compound, the fatty acid containing compound, the inorganic flame retardant, and at least one additive selected from the group consisting of an oxidation inhibitor, an ultraviolet ray deterioration inhibitor, a processing aid, a coloring agent, and an anti-static agent.

In this case, the flame retardant resin composition is composed only of the polyolefin resin, the silicone-based compound, the fatty acid containing compound, the inorganic flame retardant, and at least one additive selected from the group consisting of the oxidation inhibitor, the ultraviolet ray deterioration inhibitor, the processing aid, the coloring agent, and the anti-static agent.

In the flame retardant resin composition, it is preferable that the oxidation inhibitor is composed of at least one selected from the group consisting of a phenol-based oxidation inhibitor, an amine-based oxidation inhibitor, a sulfur-based oxidation inhibitor, a phosphorus-based oxidation inhibitor, a hydrazine-based oxidation inhibitor, an amide-based oxidation inhibitor, phosphoric acid, and citric acid, the ultraviolet ray deterioration inhibitor is composed of at least one selected from the group consisting of a benzophenone-based ultraviolet ray deterioration inhibitor, a salicylate-based ultraviolet ray deterioration inhibitor, a benzotriazole-based ultraviolet ray deterioration inhibitor, an acrylonitrile-based ultraviolet ray deterioration inhibitor, a metal complex salt-based ultraviolet ray deterioration inhibitor, and a hindered amine-based ultraviolet ray deterioration inhibitor, the processing aid is composed of at least one selected from the group consisting of a hydrocarbon-based processing aid, a fatty acid-based processing aid, a fatty acid amide-based processing aid, an ester-based processing aid, an alcohol-based processing aid, a metal soap, and wax, the coloring agent is composed of at least one selected from the group consisting of an inorganic pigment, an organic pigment, a dye, and carbon black, and the anti-static agent is composed of at least one selected from the group consisting of a cationic active agent, an anionic active agent, a non-ionic active agent, and an amphoteric active agent.

The invention is also a cable comprising an insulated wire which has a conductor and an insulating layer covering the conductor, in which the insulating layer consists of the aforementioned flame retardant resin composition.

The invention is also a cable having a conductor, an insulating layer covering the conductor, and a sheath covering the insulating layer, in which at least one of the insulating layer and the sheath consists of the aforementioned flame retardant resin composition.

The invention is also a cable having a sheath and an optical fiber provided on the inner side of the sheath or provided to penetrate the sheath, in which the sheath consists of the aforementioned flame retardant resin composition.

Meanwhile, in the invention, the decomposition onset temperature means decomposition onset temperature which is determined according to analysis of gas evolved from the flame retardant resin composition of the invention based on evolved gas analysis (EGA-MS) method. Specifically, when an EGA thermogram is measured at the following conditions by using a thermal analysis and gas chromatograph-mass spectrometry (trade name: "GCMS-QP2010", manufactured by Shimadzu Corporation) in which a sample loading part equipped with a thermal decomposition device (pyrolyzer) and a gas chromatograph-mass spectrometry are connected to each other via a capillary tube made of SUS (trade name: "Ultra ALLOY-DTA", manufactured by Frontier Laboratories Ltd., inner diameter of 0.15 mm and length of 2.5 m), the decomposition onset temperature refers to the temperature which corresponds to a peak rising point with respect to a baseline in the thermogram.

<Conditions>
Temperature increasing rate in thermal decomposition device: 50° C./min
Temperature range: 70 to 700° C.
Column oven temperature: 320° C.
Carrier gas: helium
Pressure: 90.0 kPa
Column flow rate: 0.92 mL/min Effect of the Invention According to the invention, a flame retardant resin composition which can secure excellent flame retardancy while securing an excellent mechanical property, and a cable using the composition are provided.

MODE(S) FOR CARRYING OUT THE INVENTION

Hereinbelow, a first embodiment of the invention is described in detail using FIG. 1 and FIG. 2.

[Cable]

Figure 1:
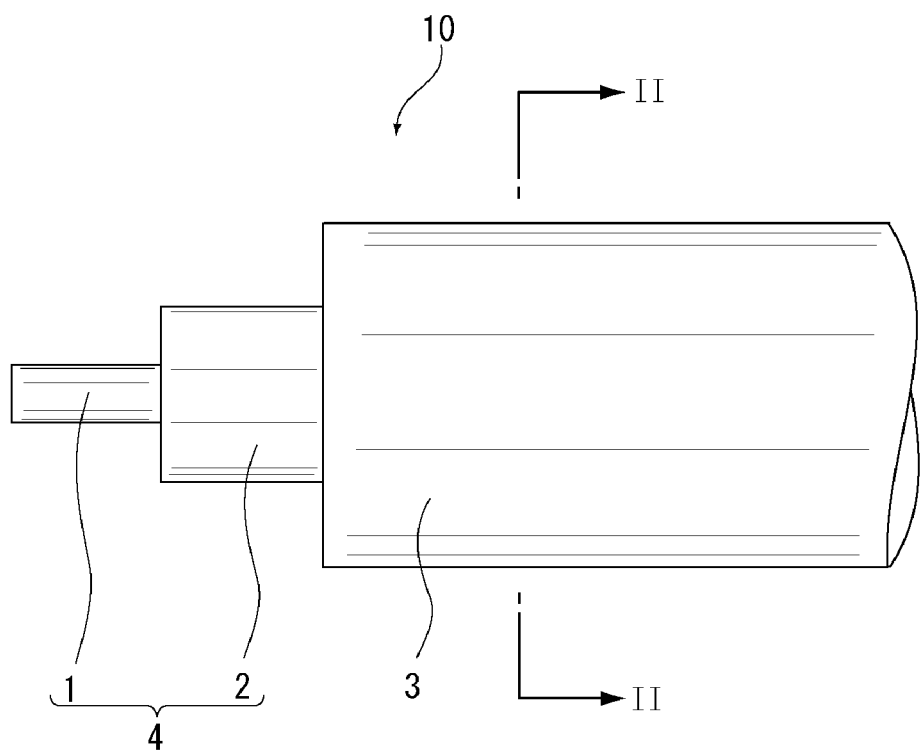
FIG. 1 is a partial side view illustrating a first embodiment of the cable of the invention.
Figure 2:
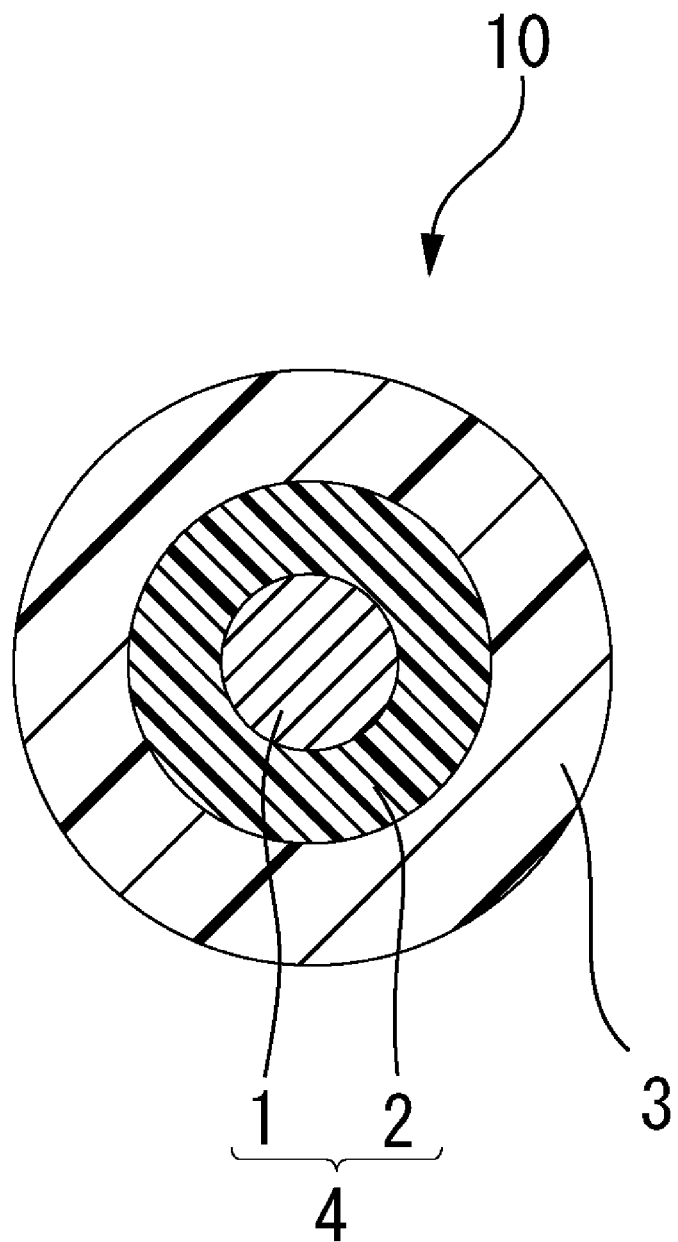
FIG. 2 is a cross-sectional view taken along the line II-II illustrated in FIG. 1.

FIG. 1 is a partial side view illustrating the first embodiment of the cable according to the invention. FIG. 2 is a cross-sectional view taken along the II-II line illustrated in FIG. 1. As illustrated in FIG. 1 and FIG. 2, a cable 10 comprises one insulated wire 4, and a sheath 3 that covers the one insulated wire 4. The insulated wire 4 has an internal conductor 1 and an insulating layer 2 that covers the internal conductor 1.

Herein, the insulating layer 2 and the sheath 3 consist of a flame retardant resin composition, and this flame retardant resin composition contains a polyolefin resin, a silicone-based compound blended at a ratio of 1.5 parts by mass or more and 20 parts by mass or less relative to 100 parts by mass of the polyolefin resin, a fatty acid containing compound blended at a ratio of 5 parts by mass or more and 20 parts by mass or less relative to 100 parts by mass of the polyolefin resin, and an inorganic flame retardant blended at a ratio of 5 parts by mass or more and 40 parts by mass or less relative to 100 parts by mass of the polyolefin resin. Herein, the decomposition onset temperature of the inorganic flame retardant is lower than the decomposition onset temperature of the silicone-based compound.

The insulating layer 2 and the sheath 3 that are formed of the aforementioned flame retardant resin composition can secure excellent flame retardancy while securing an excellent mechanical property. Accordingly, the cable 10 can secure excellent flame retardancy while securing an excellent mechanical property.

[Method for Producing Cable]

Next, a method for producing the aforementioned cable 10 is described.

(Conductor)

First, the internal conductor 1 is prepared. The internal conductor 1 may be composed of a single strand, or may be composed of plural strands that are bundled together. Furthermore, the internal conductor 1 is not particularly limited in terms of the diameter of the conductor, the material of the conductor and the like, and it can be appropriately selected in accordance with the use.

(Flame Retardant Resin Composition)

Meanwhile, the aforementioned flame retardant resin composition is prepared. The flame retardant resin composition contains a polyolefin resin, a silicone-based compound blended at a ratio of 1.5 parts by mass or more and 20 parts by mass or less relative to 100 parts by mass of the polyolefin resin, a fatty acid containing compound blended at a ratio of 5 parts by mass or more and 20 parts by mass or less relative to 100 parts by mass of the polyolefin resin, and an inorganic flame retardant blended at a ratio of 5 parts by mass or more and 40 parts by mass or less relative to 100 parts by mass of the polyolefin resin.

(Polyolefin Resin)

As described above, examples of the polyolefin resin include an ethylene-based resin and a propylene-based resin. It may be used either singly or as a mixture of two or more thereof. Herein, the ethylene-based resin refers to a resin which contains ethylene as a constitutional unit and examples of the ethylene-based resin include a polyethylene resin (PE), an ethylene ethyl acrylate copolymer (EEA), and an ethylene vinyl acetate copolymer (EVA). Furthermore, the propylene-based resin refers to a resin which contains propylene as a constitutional unit and examples of the propylene-based resin include a polypropylene resin (PP).

(Silicone-based Compound)

The silicone-based compound is a compound which functions as a flame retardant aid. Examples of the silicone-based compound include polyorganosiloxanes. Here, the polyorganosiloxanes are compounds which have siloxane bonds as a main chain, and have organic groups in side chains. Examples of the organic groups include a methyl group, a vinyl group, an ethyl group, a propyl group, and a phenyl group. Specific examples of the polyorganosiloxanes include dimethylpolysiloxane, methylethylpolysiloxane, methyloctylpolysiloxane, methylvinylpolysiloxane, methylphenylpolysiloxane, and methyl-(3,3,3-trifluoropropyl)polysiloxane. Examples of polyorganosiloxane include silicone powder, silicone gum, and silicone resin. Among them, silicone gum is preferable. In this case, blooming does not easily occur.

The silicone-based compound is blended at a ratio of 1.5 parts by mass or more and 20 parts by mass or less relative to 100 parts by mass of the polyolefin resin as described above.

When the ratio of the silicone-based compound is less than 1.5 parts by mass relative to 100 parts by mass of the polyolefin resin, the flame retardancy is significantly lowered.

Furthermore, when the blending ratio of the silicone-based compound is more than 20 parts by mass relative to 100 parts by mass of the polyolefin resin, blooming may easily occur.

The silicone-based compound is preferably blended at a ratio of 15 parts by mass or less. In this case, a more excellent mechanical property can be obtained compared to a case in which the ratio of the silicone-based compound is more than 15 parts by mass.

The silicone-based compound may be attached in advance to the surface of the inorganic flame retardant. In this case, it is preferable that the entirety of each of the inorganic flame retardant included in the flame retardant resin composition be covered with the silicone-based compound. In this case, since the inorganic flame retardant can be easily dispersed in the polyolefin resin, uniformity of the characteristics in the flame retardant resin composition is further improved.

Examples of the method of attaching the silicone-based compound to the surface of the inorganic flame retardant include, for example, a method in which the silicone-based compound is added to the inorganic flame retardant, they are mixed to obtain a mixture, the mixture is then subsequently dried at 40° C. to 75° C. for 10 minutes to 40 minutes, and the dried mixture is pulverized using a Henschel mixer, an atomizer or the like.

Meanwhile, the decomposition onset temperature (T1) of the silicone-based compound is preferably lower than the decomposition onset temperature (T2) of the polyolefin resin. In this case, an advantage of having more excellent flame retardancy is obtained compared to a case in which T1 is the same or higher than T2.

The (T2-T1) is not particularly limited if it is higher than 0° C., but it is preferably 100 to 250° C. In this case, an advantage of having more excellent flame retardancy is obtained compared to a case in which the (T2-T1) is not within the aforementioned range. The (T2-T1) is more preferably 150 to 200° C.

(Fatty Acid Containing Compound)

The fatty acid-containing compound is a compound which functions as a flame retardant aid. The fatty acid-containing compound refers to a compound containing a fatty acid or a metal salt thereof. Here, as the fatty acid, for example, a fatty acid having 12 to 28 carbon atoms is used. Examples of such a fatty acid include lauric acid, myristic acid, palmitic acid, stearic acid, tuberculostearic acid, oleic acid, linoleic acid, arachidonic acid, behenic acid, and montanic acid. Among them, the fatty acid is preferably stearic acid or tuberculostearic acid. Stearic acid is particularly preferred. In this case, more excellent flame retardancy is obtained as compared to a case in which a fatty acid other than stearic acid or tuberculostearic acid is used.

Examples of the metal that constitutes a metal salt of the fatty acid include magnesium, calcium, zinc, and lead. The metal salt of the fatty acid is preferably magnesium stearate or calcium stearate. In this case, more excellent flame retardancy is obtained as compared to a case in which a fatty acid containing compound is not either magnesium stearate or calcium stearate.

The fatty acid containing compound is blended at a ratio of 5 parts by mass or more and 20 parts by mass or less relative to 100 parts by mass of the polyolefin resin as described above.

When the ratio of the fatty acid containing compound is less than 5 parts by mass, the flame retardancy is significantly lowered.

When the blending ratio of the fatty acid containing compound is more than 20 parts by mass relative to 100 parts by mass of the polyolefin resin, blooming may easily occur.

The fatty acid containing compound is preferably blended at a ratio of 15 parts by mass or less. In this case, a more excellent mechanical property can be obtained compared to a case in which the ratio of the fatty acid containing compound is more than 15 parts by mass.

(Inorganic Flame Retardant)

The inorganic flame retardant is not particularly limited if it is an inorganic flame retardant which has lower decomposition onset temperature (T3) than the decomposition onset temperature (T1) of the silicone-based compound.

When T1-T3 is 0° C. or lower, the flame retardancy is significantly lowered.

Examples of the inorganic flame retardant include aluminum hydroxide and calcium aluminate hydrate. In particular, aluminum hydroxide is preferable. In this case, more excellent mechanical property is obtained compared to a case in which the inorganic flame retardant is an inorganic flame retardant other than aluminum hydroxide.

The (T1-T3) is not particularly limited if it is higher than 0° C., but it is preferably 50 to 250° C. In this case, an advantage of having more excellent flame retardancy is obtained compared to a case in which the (T1-T3) is not within the aforementioned range. The (T1-T3) is more preferably 50 to 150° C.

The inorganic flame retardant is blended at a ratio of 5 parts by mass or more and 40 parts by mass or less relative to 100 parts by mass of the polyolefin resin.

In this case, more significantly improved flame retardancy is obtained compared to a case in which the blending ratio of the inorganic flame retardant is more than 40 parts by mass relative to 100 parts by mass of the polyolefin resin. On the other hand, the flame retardancy is significantly improved compared to a case in which the blending ratio of the inorganic flame retardant is less than 5 parts by mass relative to 100 parts by mass of the polyolefin resin.

Furthermore, it is preferable that the inorganic flame retardant is blended at a ratio of 10 parts by mass or more and 25 parts by mass or less relative to 100 parts by mass of the polyolefin resin. In this case, the flame retardancy of the flame retardant resin composition can be improved more compared to a case in which the blending amount of the inorganic flame retardant is not within the aforementioned range.

(Additives)

The flame retardant resin composition may also contain an additive, if necessary. The additive is composed of a material which is different from the polyolefin resin, silicone-based compound, fatty acid containing compound, and inorganic flame retardant that are described above. Examples of the additive include an oxidation inhibitor, an ultraviolet ray deterioration inhibitor, a processing aid, a coloring agent, and an anti-static agent. They may be used either singly or in combination of two or more types. Herein, any one of an oxidation inhibitor, an ultraviolet ray deterioration inhibitor, a processing aid, a coloring agent, and an anti-static agent refers to an additive which does not improve the flame retardancy of the flame retardant resin composition as it is contained in the flame retardant resin composition described above. Herein, the expression "which does not improve the flame retardancy of the flame retardant resin composition" means that, when a flame retardant resin composition containing an oxidation inhibitor, an ultraviolet ray deterioration inhibitor, a processing aid, a coloring agent, or an anti-static agent is tested by single vertical wire combustion test that is used for evaluation of flame retardancy of a flame retardant resin composition in Examples and Comparative Examples described later, the test result is the same or inferior to the evaluation result of flame retardancy of a flame retardant resin composition which is different only in that it does not contain any one of an oxidation inhibitor, an ultraviolet ray deterioration inhibitor, a processing aid, a coloring agent, and an anti-static agent.

Examples of the oxidation inhibitor include a phenol-based oxidation inhibitor, an amine-based oxidation inhibitor, a sulfur-based oxidation inhibitor, a phosphorus-based oxidation inhibitor, a hydrazine-based oxidation inhibitor, an amide-based oxidation inhibitor, phosphoric acid, and citric acid. They may be used either singly or in combination of two or more types. Herein, the phenol-based oxidation inhibitor is particularly preferred as an oxidation inhibitor.

Examples of the ultraviolet ray deterioration inhibitor include a benzophenone-based ultraviolet ray deterioration inhibitor, a salicylate-based ultraviolet ray deterioration inhibitor, a benzotriazole-based ultraviolet ray deterioration inhibitor, an acrylonitrile-based ultraviolet ray deterioration inhibitor, a metal complex salt-based ultraviolet ray deterioration inhibitor, and a hindered amine-based ultraviolet ray deterioration inhibitor. They may be used either singly or in combination of two or more types. Herein, the hindered amine-based ultraviolet ray deterioration inhibitor is particularly preferred as an ultraviolet ray deterioration inhibitor.

Examples of the processing aid include a hydrocarbon-based processing aid, a fatty acid-based processing aid, a fatty acid amide-based processing aid, an ester-based processing aid, an alcohol-based processing aid, a metal soap, and wax. They may be used either singly or in combination of two or more types. Herein, the hydrocarbon-based processing aid is particularly preferred as a processing aid.

Examples of the coloring agent include an inorganic pigment, an organic pigment, a dye, and carbon black. They may be used either singly or in combination of two or more types. Herein, the inorganic pigment is particularly preferred as a coloring agent.

Examples of the inorganic pigment include a chromate salt, a ferrocyan compound, a sulfide compound, an oxide compound, a sulfate salt, a silicate salt, a carbonate salt, and a phosphate salt. They may be used either singly or in combination of two or more types.

Examples of the organic pigment include an azo-based pigment, a phthalocyanin-based pigment, a vat dye-based pigment, a lake-based pigment for dyeing, a quinacridone-based pigment, and a dioxazine-based pigment. They may be used either singly or in combination of two or more types.

Examples of the dye include an anthraquinone-based dye, an indigoid-based dye, and an azo-based dye. They may be used either singly or in combination of two or more types.

Examples of the anti-static agent include a cationic active agent, an anionic active agent, a non-ionic active agent, and an amphoteric active agent. They may be used either singly or in combination of two or more types. The cationic active agent is particularly preferred as the anti-static agent.

Examples of the cationic active agent include a primary amine salt, tertiary amine, a quaternary ammonium compound, and a pyridine derivative. They may be used either singly or in combination of two or more types.

Examples of the anionic active agent include sulfated oil, soap, sulfated ester oil, sulfated amide oil, sulfated ester, sulfonate, and phosphoric acid ester. They may be used either singly or in combination of two or more types.

Examples of the non-ionic active agent include polyhydric alcohol fatty acid ester and ethylene oxide adduct. They may be used either singly or in combination of two or more types.

Examples of the amphoteric active agent include a carboxylic acid derivative and an imidazoline derivative. They may be used either singly or in combination of two or more types.

The blending amount of the additive relative to 100 parts by mass of the polyolefin resin is not particularly limited. However, it is preferably 2 parts by mass or less, and more preferably 1 part by mass or less. However, the blending amount of the additive is preferably 0.1 part by mass or more relative to 100 parts by mass of the polyolefin resin.

The flame retardant resin composition can be obtained by kneading the polyolefin resin, the inorganic flame retardant, the silicone-based compound, the fatty acid containing compound and the like. Kneading can be carried out by using, for example, a kneading device such as a Banbury mixer, a tumbler, a pressurized kneader, a kneader extruder, a twin screw extruder, a mixing roll or the like. At this time, from the viewpoint of improving the dispersion property of the silicone-based compound, a master batch (MB) obtained by kneading a portion of the polyolefin resin and the silicone-based compound may be kneaded with the remaining polyolefin resin, the inorganic flame retardant, the fatty acid containing compound, and the like.

Next, the internal conductor 1 is covered with the aforementioned flame retardant resin composition. Specifically, the flame retardant resin composition described above is melt kneaded by using an extruder, and a tube-shaped extrusion product is formed. Then, this tube-shaped extrusion product is continuously coated on the internal conductor 1. Thus, the insulated wire 4 is obtained.

(Sheath)

Finally, one insulated wire 4 obtained as described above is prepared, and this insulated wire 4 is coated with the sheath 3 which has been produced by using the flame retardant resin composition described above. The sheath 3 protects the insulating layer 2 from physical or chemical damage.

Thus, a cable 10 is obtained.

The invention is not limited to the first embodiment described above. For example, in the above first embodiment, the cable 10 has one insulated wire 4; however, the cable of the invention is not limited to a cable which has only one insulated wire 4, and the cable may have two or more insulated wires 4 on the inner side of the sheath 3. Furthermore, a resin section formed of polypropylene or the like may also be provided between the sheath 3 and the insulated wire 4.

Furthermore, in the above first embodiment, the insulating layer 2 and the sheath 3 of the insulated wire 4 are formed of the flame retardant resin composition, but it is also possible that the insulating layer 2 is formed of a typical insulating resin, and only the sheath 3 is formed of the flame retardant resin composition that constitutes the insulating layer 2.

Furthermore, although the flame retardant resin composition of the invention is applied to the insulating layer 2 and the sheath 3 of the insulated wire 4 in the aforementioned first embodiment, the flame retardant resin composition of the invention can be applied to a sheath of an optical fiber cable, that is, a sheath of a cable which has a sheath and an optical fiber provided on the inner side of the sheath or provided to penetrate the sheath. Herein, examples of the optical fiber cable include a drop type optical fiber cable, an indoor type optical fiber cable, a layer type optical fiber cable, a tape slot type optical fiber cable and the like.

Figure 3:
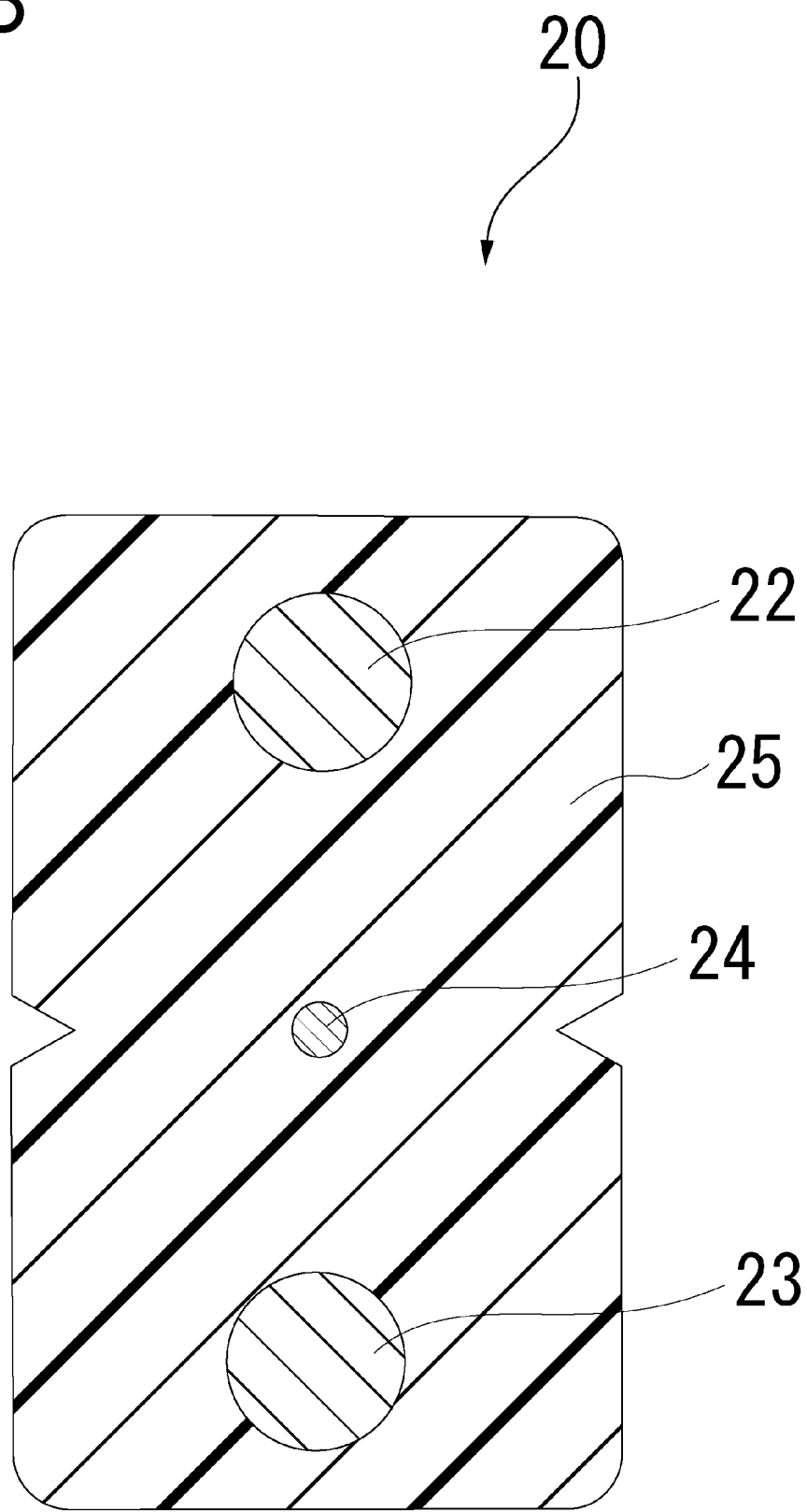
FIG. 3 is a cross-sectional view illustrating a second embodiment of the cable of the invention.

FIG. 3 is a cross-sectional view illustrating an indoor type optical fiber cable. As shown in FIG. 3, an indoor type optical fiber cable 20 is provided with two tension members 22 and 23, an optical fiber 24, and a sheath 25 covering them. Herein, the optical fiber 24 is provided to penetrate the sheath 25.

Figure 4:
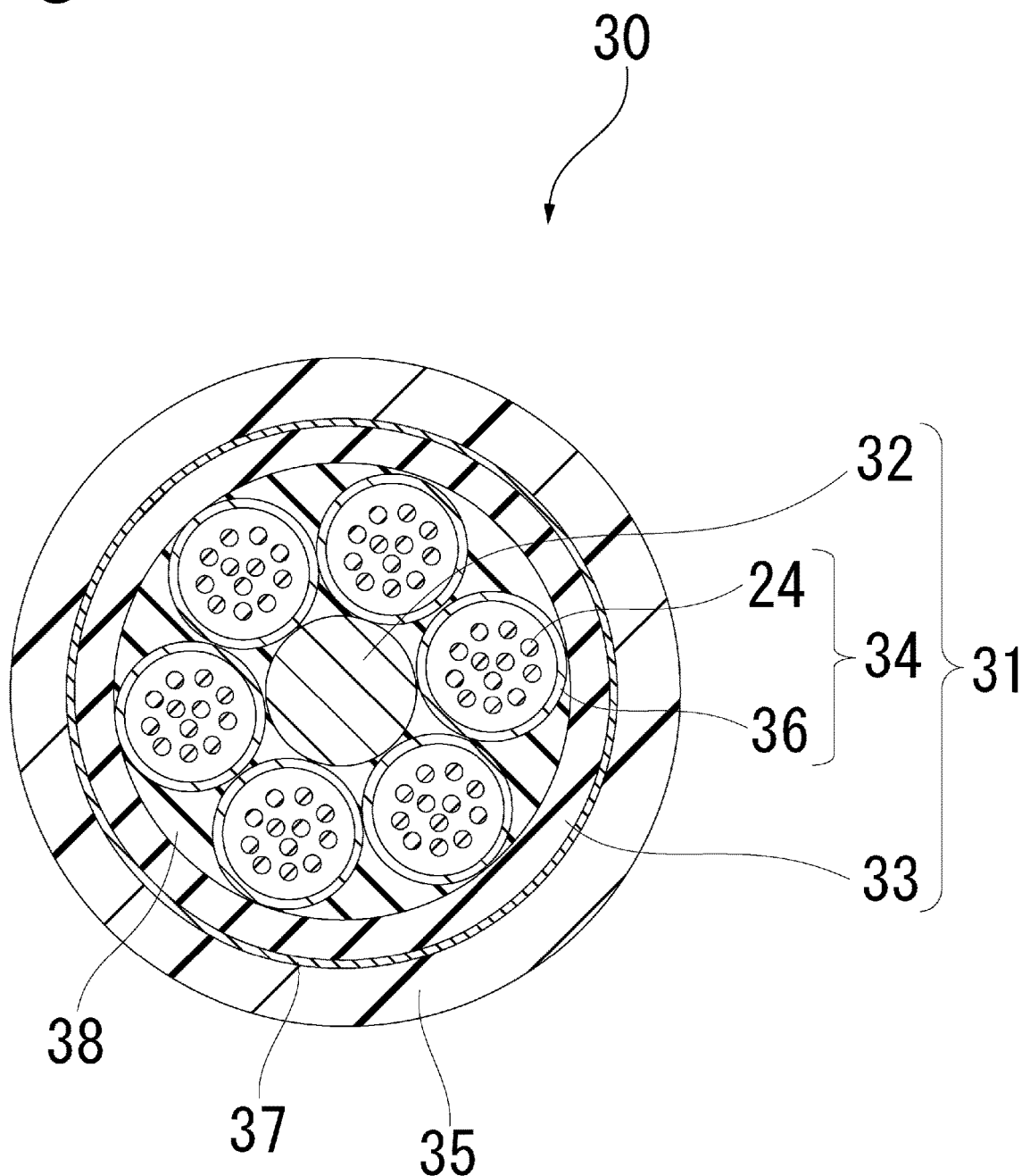
FIG. 4 is a cross-sectional view illustrating a third embodiment of the cable of the invention.

FIG. 4 is a cross-sectional view illustrating a layer type optical fiber cable. As shown in FIG. 4, a layer type optical fiber cable 30 is provided with a core part 31 and a sheath 35 provided to surround the core part 31. The core part 31 is provided with a tension member 32, a rip cord 33 provided to surround the tension member 32, and an optical fiber unit 34 which is arranged, between the tension member 32 and the rip cord 33, along the longitudinal direction of the tension member 32. Herein, the optical fiber unit 34 is formed by disposing the optical fiber 24 on the inner side of a tube 36 which is either colored or non-colored. Accordingly, the optical fiber 24 is provided on the inner side of the sheath 35. Meanwhile, a press winding tape 37 is generally wound around the core part 31. However, the layer type optical fiber cable 30 may not have the press winding tape 37. Furthermore, a water-proofing material 38 may also be filled around the optical fiber unit 34 between the rip cord 33 and the tension member 32.

In the aforementioned optical fiber cable, the sheath 25 and the sheath 35 consist of the flame retardant resin composition of the invention.

EXAMPLES

Hereinbelow, the contents of the invention are more specifically described by way of Examples and Comparative Examples, but the invention is not limited to the following Examples.

Examples 1 to 14 and Comparative Examples 1 to 7

A base resin, a silicone master batch (silicone MB), a fatty acid containing compound, and an inorganic flame retardant were blended in the blending amounts indicated in Tables 1 to 5, and they were kneaded for 15 minutes at 160° C. by a Banbury mixer. Thus, a flame retardant resin composition was obtained. Meanwhile, in Tables 1 to 5, the unit of the blending amount of each of the blended components is parts by mass. Furthermore, in Tables 1 to 5, the blending amount of a polyethylene resin (PE), an ethylene ethyl acrylate copolymer (EEA), an ethylene vinyl acetate copolymer (EVA), or a polypropylene resin (PP) is not 100 parts by mass. However, since the resin is also included in the silicone MB, the total amount of the base resin becomes 100 parts by mass when the resin in silicone MB is added with PE, EEA, EVA, or PP. Furthermore, in Tables 1 to 5, the decomposition onset temperature of the inorganic flame retardant (T3), the decomposition onset temperature of the silicone-based compound (T1), and the decomposition onset temperature of the base resin (T2) are also indicated.

As the base resin, the silicone MB, the fatty acid containing compound, and the inorganic flame retardant, specifically those described below were used.

(1) Base Resin (A) Polyethylene resin (PE) (trade name: "EXCELLEN GMH GH030", manufactured by Sumitomo Chemical Company, Limited)

(B) Ethylene ethyl acrylate copolymer (EEA, trade name: "DPDJ-6503", manufactured by Nippon Unicar Company Limited)

(C) Ethylene vinyl acetate copolymer (EVA, trade name: "Evaflex V5274", manufactured by DUPONT-MITSUI POLYCHEMICALS CO., LTD.)

(D) Polypropylene resin (PP, trade name: "E111G", manufactured by Prime Polymer Co., Ltd.)

(2) Silicone MB (trade name: "X-22-2125H", manufactured by Shin-Etsu Chemical Co., Ltd.) containing 50% by mass of silicone gum and 50% by mass of PE (3) Fatty acid containing compound Mg stearate (trade name: "AFCO CHEM MGS", manufactured by ADEKA CORPORATION)

Ca stearate (trade name: "SC-P", manufactured by Sakai Chemical Industry Co., Ltd.)

(4) Inorganic Flame Retardant

A) Aluminum hydroxide (trade name: "BF013", manufactured by Nippon Light Metal Company, Ltd., average particle diameter: 1.2 μm)

B) Magnesium hydroxide (trade name: "MAGSEEDS N6", manufactured by Konoshima Chemical Co., Ltd.)

C) Calcium hydroxide (manufactured by Yoshizawa Lime Industry CO., LTD.)

Subsequently, the flame retardant resin composition was kneaded for 15 minutes at 160° C. by using a Banbury mixer. Thereafter, this flame retardant resin composition was fed into a single screw extruder (L/D=20, screw type: full flight screw, manufactured by Marth Seiki Co., Ltd.), and a tube-shaped extrusion product was extruded from the extruder and coated on a conductor (number of strands: one/cross-sectional area: 2 mm$^2$) to have a thickness of 0.7 mm. Thus, an insulated wire was obtained.

TABLE 1

| | | | Comparative Example 1 | Example 1 | Example 2 | Example 3 | Example 4 | Example 5 | Comparative Example 2 |
|---|---|---|---|---|---|---|---|---|---|
| Resin composition | Base resin | PE | 97 | 97 | 97 | 97 | 97 | 97 | 97 |
| | Silicone-based compound | Silicone MB (PE/silicone) | 3/3 | 3/3 | 3/3 | 3/3 | 3/3 | 3/3 | 3/3 |
| | Fatty acid containing compound | Mg stearate | 5 | 5 | 5 | 5 | 5 | 5 | 5 |
| | Inorganic flame retardant | Aluminum hydroxide | 3 | 5 | 10 | 20 | 25 | 40 | 50 |
| Decomposition onset temperature [° C.] | Inorganic flame retardant (T3) | | 220 | 220 | 220 | 220 | 210 | 210 | 220 |
| | Silicone-based compound (T1) | | 300 | 290 | 300 | 300 | 300 | 300 | 300 |
| | Base resin (T2) | | 450 | 450 | 450 | 460 | 460 | 450 | 450 |
| Flame retardancy | Vertical combustion test | Pass rate (%) | 60 | 80 | 100 | 100 | 100 | 80 | 10 |
| Mechanical property | Tensile strength (MPa) | | 20.8 | 20.6 | 20.4 | 16.4 | 17.8 | 14.8 | 13.3 |

TABLE 2

| | | | Comparative Example 3 | Comparative Example 4 | Example 6 | Example 7 | Example 8 |
|---|---|---|---|---|---|---|---|
| Resin composition | Base resin | PE | 100 | 99 | 98.5 | 90 | 85 |
| | Silicone-based compound | Silicone MB (PE/silicone) | | 1/1 | 1.5/1.5 | 10/10 | 15/15 |
| | Fatty acid containing compound | Mg stearate | 5 | 5 | 5 | 5 | 5 |
| | Inorganic flame retardant | Aluminum hydroxide | 20 | 20 | 20 | 20 | 20 |
| Decomposition onset temperature [° C.] | Inorganic flame retardant (T3) | | 200 | 210 | 200 | 230 | 200 |
| | Silicone-based compound (T1) | | — | 300 | 300 | 290 | 310 |
| | Base resin (T2) | | 450 | 440 | 450 | 470 | 460 |
| Flame retardancy | Vertical combustion test | Pass rate (%) | 0 | 0 | 100 | 100 | 100 |
| Mechanical property | Tensile strength (MPa) | | 20.0 | 20.4 | 19.7 | 16.2 | 12.1 |

TABLE 3

| | | | Comparative Example 5 | Example 9 | Example 10 |
|---|---|---|---|---|---|
| Resin composition | Base resin | PE | 97 | 97 | 97 |
| | Silicone-based compound | Silicone MB (PE/silicone) | 3/3 | 3/3 | 3/3 |
| | Fatty acid containing compound | Mg stearate | 2 | 10 | 20 |
| | Inorganic flame retardant | Aluminum hydroxide | 20 | 20 | 20 |
| Decomposition onset temperature [° C.] | Inorganic flame retardant (T3) | | 210 | 200 | 210 |
| | Silicone-based compound (T1) | | 600 | 290 | 310 |
| | Base resin (T2) | | 450 | 450 | 470 |
| Flame retardancy | Vertical combustion test | Pass rate (%) | 0 | 100 | 100 |
| Mechanical property | Tensile strength (MPa) | | 18.2 | 16.8 | 16.2 |

TABLE 4

|  |  |  | Example 11 | Example 12 | Example 13 | Example 14 |
|---|---|---|---|---|---|---|
| Resin composition | Base resin | PE |  |  |  | 97 |
|  |  | EEA | 97 |  |  |  |
|  |  | EVA |  | 97 |  |  |
|  |  | PP |  |  | 97 |  |
|  | Silicone-based compound | Silicone MB (PE/silicone) | 3/3 | 3/3 | 3/3 | 3/3 |
|  | Fatty acid containing compound | Mg stearate | 5 | 5 | 5 |  |
|  |  | Ca stearate |  |  |  | 10 |
|  | Inorganic flame retardant | Aluminum hydroxide | 20 | 20 | 20 | 20 |
| Decomposition onset temperature [° C.] |  | Inorganic flame retardant (T3) | 120 | 200 | 210 | 230 |
|  |  | Silicone-based compound (T1) | 290 | 310 | 300 | 390 |
|  |  | Base resin (T2) | 430 | 420 | 470 | 460 |
| Flame retardancy |  | Vertical combustion test Pass rate (%) | 100 | 100 | 100 | 100 |
| Mechanical property |  | Tensile strength (MPa) | 17.1 | 23.3 | 22.1 | 18.5 |

TABLE 5

|  |  |  | Comparative Example 6 | Comparative Example 7 |
|---|---|---|---|---|
| Resin composition | Base resin | PE | 97 | 97 |
|  | Silicone-based compound | Silicone MB (PE/silicone) | 3/3 | 3/3 |
|  | Fatty acid containing compound | Mg stearate | 5 | 5 |
|  | Inorganic flame retardant | Aluminum hydroxide |  |  |
|  |  | Magnesium hydroxide | 20 |  |
|  |  | Calcium hydroxide |  | 20 |
| Decomposition onset temperature [° C.] |  | Inorganic flame retardant (T3) | 350 | 400 |
|  |  | Silicone-based compound (T1) | 290 | 270 |
|  |  | Base resin (T2) | 460 | 450 |
| Flame retardancy |  | Vertical combustion test Pass rate (%) | 0 | 0 |
| Mechanical property |  | Tensile strength (MPa) | 18.5 | 16.5 |

For the insulated wires of Examples 1 to 14 and Comparative Examples 1 to 7 obtained as described above, evaluation of the flame retardancy and the mechanical property was made as described below.

<Flame Retardancy>

Ten insulated wires were prepared for each of Examples 1 to 14 and Comparative Examples 1 to 7. Then, a single vertical combustion test was performed for those wires based on JIS C3665-1, and the flame retardancy was evaluated. Specifically, when the length between the lower end of the upper supporting member, which supports the insulated wire at the top, and the end point of carbonization is 50 mm or more and 540 mm or less, it is graded as "pass", and the length less than 50 mm or more than 540 mm is graded as "failure." Then, the pass rate (%) was calculated. The results are shown in Tables 1 to 5. Meanwhile, in the combustion test, the insulated wire was brought into contact with burner flame for 60 seconds. Furthermore, in Tables 1 to 5, the criteria for evaluating the pass or failure in terms of the flame retardancy is as follows.

Pass rate of 70% or more: Pass
Pass rate of less than 70%: Failure

<Mechanical Property>

The evaluation of the mechanical property for the insulated wires of Examples 1 to 14 and Comparative Examples 1 to 7 was performed based on the tensile strength that is measured by tensile test according to JIS C3005. The results are shown in Tables 1 to 5. In Tables 1 to 5, the unit of the tensile strength is MPa, and the criteria for evaluating the pass or failure in terms of the tensile strength is as follows. In the tensile test, the elongation rate was 200 mm/min and the distance between surface lines was 20 mm.

10 MPa or more: Pass
Less than 10 MPa: Failure

From the results of Tables 1 to 5, the insulated wires of Examples 1 to 14 satisfied the pass criteria in terms of the flame retardancy and the mechanical property. In contrast, the insulated wires of Comparative Examples 1 to 7 did not satisfy the pass criteria in terms of at least one of the flame retardancy and the mechanical property.

In view of the above, it was confirmed that the flame retardant resin composition of the invention can secure excellent flame retardancy while securing an excellent mechanical property.

EXPLANATIONS OF NUMERALS

1 INTERNAL CONDUCTOR
2 INSULATING LAYER
3, 25, 35 SHEATH
4 INSULATED WIRE
10, 20, 30 CABLE

The invention claimed is:

1. A flame retardant resin composition comprising:
a polyolefin resin;
a silicone-based compound blended at a ratio of 1.5 parts by mass or more and 20 parts by mass or less relative to 100 parts by mass of the polyolefin resin;
a fatty acid containing compound blended at a ratio of 5 parts by mass or more and 20 parts by mass or less relative to 100 parts by mass of the polyolefin resin; and
an inorganic flame retardant blended at a ratio of 5 parts by mass or more and 40 parts by mass or less relative to 100 parts by mass of the polyolefin resin,
wherein the decomposition onset temperature of the inorganic flame retardant is lower than the decomposition onset temperature of the silicone-based compound, and wherein a vertical combustion test pass rate for a wire which has a conductor and a layer, formed of the flame retardant resin composition, covering the conductor is 100%.

2. The flame retardant resin composition according to claim 1, wherein the inorganic flame retardant is aluminum hydroxide.

3. The flame retardant resin composition according to claim 1, wherein the inorganic flame retardant is blended at a ratio of 10 parts by mass or more and 25 parts by mass or less relative to 100 parts by mass of the polyolefin resin.

4. The flame retardant resin composition according to claim 1, wherein the fatty acid containing compound is magnesium stearate or calcium stearate.

5. The flame retardant resin composition according to claim 1, wherein the composition comprises the polyolefin resin, the silicone-based compound, the fatty acid containing compound, the inorganic flame retardant, and at least one additive selected from the group consisting of an oxidation inhibitor, an ultraviolet ray deterioration inhibitor, a processing aid, a coloring agent, and an anti-static agent.

6. The flame retardant resin composition according to claim 5, wherein
the oxidation inhibitor is formed of at least one selected from the group consisting of a phenol-based oxidation inhibitor, an amine-based oxidation inhibitor, a sulfur-based oxidation inhibitor, a phosphorus-based oxidation inhibitor, a hydrazine-based oxidation inhibitor, an amide-based oxidation inhibitor, phosphoric acid, and citric acid,
the ultraviolet ray deterioration inhibitor is formed of at least one selected from the group consisting of a benzophenone-based ultraviolet ray deterioration inhibitor, a salicylate-based ultraviolet ray deterioration inhibitor, a benzotriazole-based ultraviolet ray deterioration inhibitor, an acrylonitrile-based ultraviolet ray deterioration inhibitor, a metal complex salt-based ultraviolet ray deterioration inhibitor, and a hindered amine-based ultraviolet ray deterioration inhibitor,
the processing aid is formed of at least one selected from the group consisting of a hydrocarbon-based processing aid, a fatty acid-based processing aid, a fatty acid amide-based processing aid, an ester-based processing aid, an alcohol-based processing aid, a metal soap, and wax,
the coloring agent is formed of at least one selected from the group consisting of an inorganic pigment, an organic pigment, a dye, and carbon black, and
the anti-static agent is formed of at least one selected from the group consisting of a cationic active agent, an anionic active agent, a non-ionic active agent, and an amphoteric active agent.

7. A cable comprising an insulated wire which has a conductor and an insulating layer covering the conductor, wherein the insulating layer is formed of the flame retardant resin composition according to claim 1.

8. A cable having a conductor, an insulating layer covering the conductor, and a sheath covering the insulating layer, wherein at least one of the insulating layer and the sheath is formed of the flame retardant resin composition according to claim 1.

9. A cable having a sheath and an optical fiber provided on the inner side of the sheath or provided to penetrate the sheath, wherein the sheath is formed of the flame retardant resin composition according to claim 1.

10. The flame retardant resin composition according to claim 1, wherein the decomposition onset temperature of the silicone-based compound is lower than the decomposition onset temperature of the polyolefin resin.

11. The flame retardant resin composition according to claim 10, wherein the difference between the decomposition onset temperature of the silicone-based compound and the decomposition onset temperature of the polyolefin resin is 100 to 250° C.

12. The flame retardant resin composition according to claim 1, wherein the difference between the decomposition onset temperature of the inorganic flame retardant and decomposition onset temperature of the silicone-based compound is 50 to 250° C.

13. The flame retardant resin composition according to claim 12, wherein the difference between the decomposition onset temperature of the inorganic flame retardant and decomposition onset temperature of the silicone-based compound is 50 to 150° C.

* * * * *